Feb. 3, 1970  R. B. OLSON  3,492,769
ANTENNA MOUNT
Filed May 23, 1968

INVENTOR
Roger B. Olson
BY *Scofield, Kokjer, Scofield & Lowe*
ATTORNEYS 3,492,769
ANTENNA MOUNT
Roger B. Olson, Lincoln, Nebr., assignor to Hy-Gain Electronics Corporation, Lincoln, Nebr., a corporation of Nebraska
Filed May 23, 1968, Ser. No. 731,441
Int. Cl. H01q 1/12
U.S. Cl. 52—110          7 Claims

ABSTRACT OF THE DISCLOSURE

An antenna is carried by a cap member which is removably connected to a base secured to a support structure such as a vehicle roof deck, trunk deck or the like. The base comprises an annular hub having movably connected thereto retaining members which engage and cooperate with the edge of a hole in the support structure through which the antenna leads pass to releasably secure the base to the support structure.

BACKGROUND OF THE INVENTION

Mobile antennas are in widespread use, particularly in the operation of automobiles and trucks. Various types have been developed and the type with which this application is concerned includes those antennas which normally are mounted on the roof deck of the vehicle, although they also could be mounted on a closed cab structure of a truck or on trunk decks or the like.

Roof mounting has heretofore posed some rather serious problems, principally in the ability to obtain security of the mount without doing considerable damage to the vehicle by way of drilling a number of holes for the mounting fasteners. Single hole mountings have been provided, but these require either holes of extremely accurate controlled diameter or bulky inside retainers, or both. As a consequence, there has long been a need for a mobile antenna mount which can be installed through use of a single hole which accommodates both the mounting fasteners and antenna leads, which can be installed easily and quickly working from outside the vehicle alone and which can be accommodated to a wide range of hole sizes and shapes. The present invention has as one of its principal aims the serving of these objectives.

SUMMARY OF THE INVENTION

The antenna mount of the present invention includes an antenna mounting hub which is positioned on the roof surrounding the single opening thereon. Located around and connected with the hub are a plurality of angularly spaced retainers which have portions radially adjustable with respect to the hub and which are disposed inside the hole and beneath the roof around the hole. By working from outside the hub, the retainers can be tightened against and released from the rim of the hole to secure the hub in place or release it as it is desired. The mounting is completed by a cap piece carrying the antenna, the cap piece having a demountable connection with the hub.

An antenna mount according to my invention has many advantages over those presently available, in addition to the advantages noted earlier. It is easily removed and shifted to a different location. Since it is accommodatable in any given size to a wide range of hole sizes and shapes, it is particularly suited for use as a replacement mount for damaged or obsolete mounts, since it can be placed in the same hole as the previous mount even though some damage to the hole has resulted from removal of the predecessor. It is neat in appearance and is so constructed that the manner of effecting removal is not at once apparent, thus reducing the likelihood of tampering or theft.

Other objects and advantages of the invention, together with the features of novelty appurtenant thereto, will appear in the course of the following description.

DETAILED DESCRIPTION

In the accompanying drawing, which forms a part of the specification and is to be read in conjunction therewith, and in which like reference numerals indicate like parts in the various views.

Figure 1:
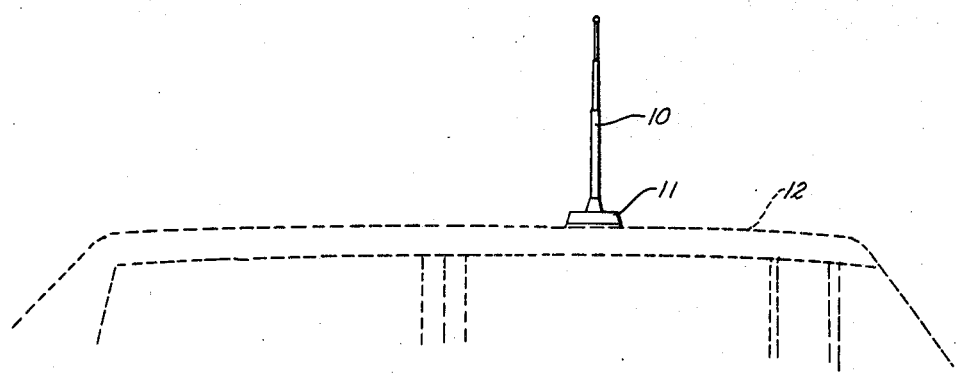
FIG. 1 is a side elevational view of an antenna having a mount in accordance with a preferred form of the present invention, the roof deck of an automobile being shown in broken lines.

Referring to the drawing, the antenna of the present invention is indicated generally at 10. This antenna is illustrated as a telescopically extendible antenna structure, although it will be evident that this particular type is not a necessary part of the invention. The antenna is carried by a cap piece 11 which in turn is secured to a mounting hub, described below, which is fastened to the roof deck 12 of the illustrated vehicle.

Figure 2:
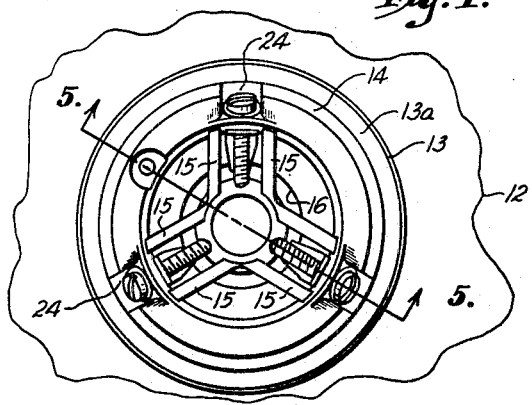
FIG. 2 is a top plan view of the hub member of the mount, the cap piece and antenna having been removed for purposes of illustration and only a fragment of the roof deck being shown.
Figure 3:
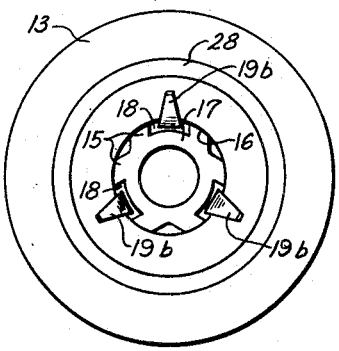
FIG. 3 is a bottom plan view of the hub removed from the roof deck.
Figure 4:
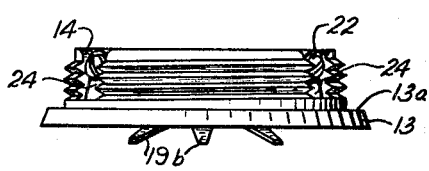
FIG. 4 is a side elevational view of the hub, not showing the roof deck.
Figure 5:
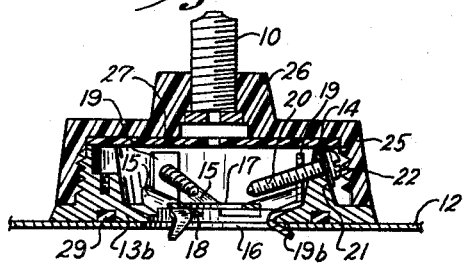
FIG. 5 is a sectional view of the hub with the antenna cap and antenna connected thereto, the view being taken generally along the line represented by line 5—5 of FIG. 2 in the direction of the arrows.
Figures 6, 7:
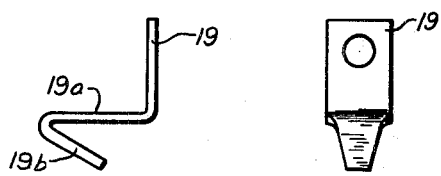
FIG. 6 is an enlarged side elevational view of a typical retainer member.
FIG. 7 is a side view of the retainer taken from the left hand side of FIG. 6.

The hub structure to which cap 11 is mounted is illustrated in detail in FIGS. 2 through 5, inclusive. It is basically circular in configuration, having a base flange 13 providing an annular horizontal shoulder 13a. Extending above the base flange is an externally threaded annular ring 14. It will be understood that preferably the hub is a one piece structure, being cast and machined as required in order to achieve the configuration shown.

At the inside of the lower portion of the hub, and in effect forming an inward continuation of the base flange 13, is the inwardly extending flange 13b. This flange carries at equi-angularly spaced intervals around its upper surface (in this case at angles of 120°) three pairs of guide rib structures 15 which are equi-spaced to either side of radii from the center of the hub and which, as will be seen, serve as guide members for the mounting retainer members. The top surface of the flange 13b between guide ribs 15 is in each case inclined downwardly and inwardly toward the center of the hub. The edge 16 of the inner flange 13b defines a central circular opening in the hub. Aligned with the opening 16 and spaced thereabove is a ring 17 which, in the preferred embodiment, is formed integrally with and is supported by the outer ends of the converging guide ribs 15. The ring 17 forms in cooperation with the ribs a plurality of apertures 18 which establish communication between the spaces located between ribs 15 and the space below the ring 17.

Each pair of ribs 15 defines a guide way in which is situated a specially shaped retainer member 19 having the substantially vertical upper portion and a generally J-shaped lower portion 19a. The inturned lower leg 19b of the retainer extends below the bottom surface of the hub. Preferably, portions 19b are tapered toward their outer ends.

Each retainer member 19 has in the vertical portion a threaded opening adapted to receive a radially inwardly projecting thrust screw 20 which extends through and is journaled in an opening in the wall of the hub. Each screw has a washer 21 (either separate or attached) on the exterior of the hub and a slotted head 22. Obviously, other tool engaging arrangements other than the slotted head may be utilized.

Each screw head is received in a corresponding inwardly directed recess 24 formed in the outside wall of the hub. The recess is of sufficient depth that the outermost portion of the head lies well within the base of the threads on the exterior of the hub.

The antenna mount structure is completed by an internally threaded, inverted cup-like cap piece 25 which preferably is made of a phenolic plastic or some other strong plastic material. This cap piece 25 includes the central boss 26 which is apertured to receive the lower end of the antenna 10. An internal insulator 27 is supported inside the cap piece. The cap piece, internal insulator and antenna are conventional in construction and except as the cap piece cooperates with the hub, the features of these elements do not form a part of the invention. The base of the hub is provided with an annular groove 28 which is adapted to receive a resiliently compressible O-ring 29 for the purpose of establishing a ring-like seal around the base of the hub.

In installing the antenna mount of the invention, initially the retainer members 19 are displaced inwardly sufficiently that the tips of the outturned retainer portions 19b will lie on a circle which is substantially the same as or slightly lesser in diameter than the diameter of the opening 12a which is formed in the roof 12. This opening is, of course, for the electric leads (not shown) to the antenna. The hub with the cap removed is then centered on and seated with the retainers in the inwardly extended position. Once in place, it is held in position while the screws 20 are used to draw the retainers 19 outwardly and thereby engage the portions 19b with the underside of the roof around the opening 12a. It will be evident that as the retainers are drawn inwardly, the portions 19b are raised due to the inwardly and downwardly inclined upper surface of flange 13b on which they rest. The retainers are also guided by the ribs or guides 15. A resilient holding pressure is applied through continuing to turn the screws once the retainers are engaged so that the upper portion is elastically bent at a greater angle with respect to portion 19a.

The inner ring 17 serves a useful function in helping to maintain the retainer members 19 in a potentially operative position at times when the retainers are extended as they are prior to assembly. In other words, the ring prevents the retainers from riding upwardly inside the hub since the ring will engage the upper surface of portions 19a when the retainers are in the inwardly extended position.

To complete the assembly, once the retainers are firmly engaged, the cap piece is threaded onto the hub. Once threaded completely into position, the cap piece covers and conceals the screw heads 22, protecting against intrusion of moisture and also preventing access.

It will be evident that the mount can easily be disconnected from the roof. All that is required is to remove the cap 25, turn the screws in a direction to impel the retainer members 19 inwardly until the portions 19b are disengaged from the roof and then remove the hub.

From the foregoing, it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations.

As many possible embodiments may be made of the invention, it is to be understood that all matter herein set forth or shown in the accompanying drawing is to be interpreted as illustrative.

Having thus described my invention, I claim:

1. The combination with a surface having an opening therein defined by an edge, of
    an annular hub having one end positionable against said surface with the hub circumscribing said opening,
    a plurality of retainer members having portions engaging said edge and spaced circumferentially from one another around the inside of said hub,
    means adjustably connecting said retainer members with said hub and operable to disengage said retaining portions from said edge whereby to permit removal of said hub from said surface when desired,
    a cap piece mounted on and supported from said hub, and
    an antenna secured to said cap piece and projecting away from said hub.

2. The combination as in claim 1,
    said connecting means including thrust screws journaled in said hub and operable selectively to move said retainer members toward or away from said edge.

3. The combination as in claim 2,
    said thrust screws having heads exposed on the outside of said hub,
    said cap members having a skirt portion normally covering and concealing said heads.

4. The combination as in claim 2,
    said hub having guide means interiorly thereof associated with said members and operable to confine the movement thereof to a preselected path.

5. The combination as in claim 1,
    said hub having an annular groove in the face thereof confronting said surface, and
    a ring-like sealing member in said groove in sealing contact with said surface.

6. The combination as in claim 1,
    each said retaining member having a retainer portion comprising a generally J-shaped structure with one leg of the J below said edge and the other leg above.

7. The combination as in claim 6.
    each of said retaining members including a threaded opening,
    said means for connecting same to the hub comprising a thrust screw threadably connected in said opening and journaled in said hub.

References Cited

UNITED STATES PATENTS

| | | | |
|---|---|---|---|
| 1,516,614 | 11/1924 | MacLellan | 248—205 X |
| 2,201,611 | 5/1940 | Del Camp | 248—223 |
| 2,468,391 | 4/1949 | Cejka | 343—888 X |
| 2,558,328 | 6/1951 | Winslow | 248—205 |
| 3,076,936 | 2/1963 | Housman | 343—713 X |
| 3,222,093 | 12/1965 | Simmons | 285—162 |

FRANK L. ABBOTT, Primary Examiner

PRICE C. FAW, JR., Assistant Examiner

U.S. Cl. X.R.

248—43; 287—23; 343—713, 888